April 21, 1964     H. C. REYNOLDS     3,129,571
IMPACT TOOL TORQUE LIMITING CONTROL
Filed Jan. 3, 1962
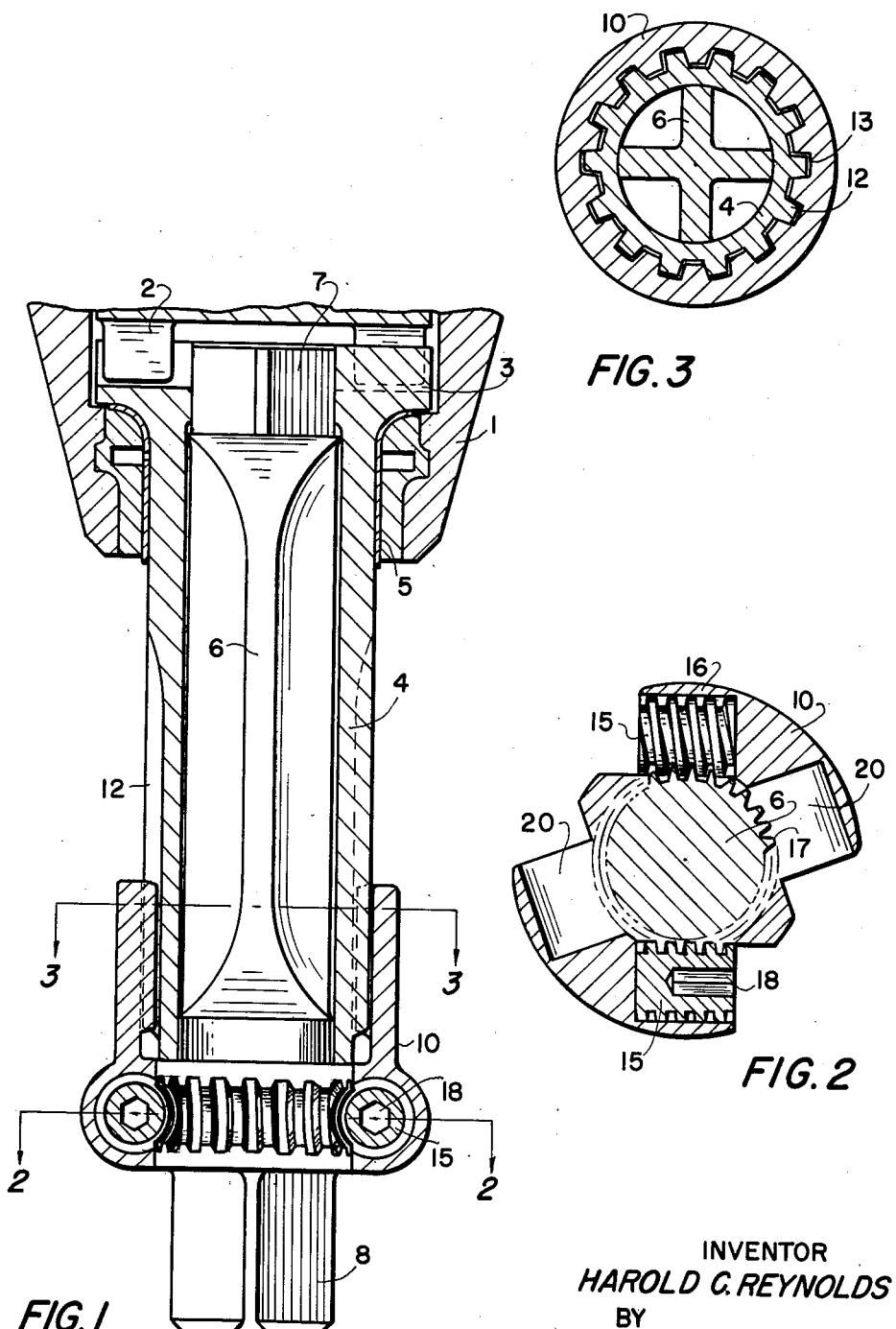
INVENTOR
HAROLD C. REYNOLDS
BY
David W. Tibbotts
HIS ATTORNEY United States Patent Office 3,129,571
Patented Apr. 21, 1964

3,129,571
IMPACT TOOL TORQUE LIMITING CONTROL
Harold C. Reynolds, Athens, Pa., assignor to Ingersoll-Rand Company, New York, N.Y., a corporation of New Jersey
Filed Jan. 3, 1962, Ser. No. 164,072
6 Claims. (Cl. 64—27)

This invention relates to rotary impact tools having torque limiting means which can be adjusted to vary the maximum magnitude or amount of torque applicable by such tools to a workpiece, such as a nut or the like.

A conventional rotary impact tool having an adjustable torque limiting means is disclosed by the U.S. Patent No. 2,822,677, issued February 11, 1958, to H. C. Reynolds. This tool includes an axially extending torsion spring or bar which is utilized to transmit rotary impacts to a workpiece. The torsion spring is wound or pre-stressed to a predetermined value of torque corresponding to the maximum torque load that is to be transmitted by the torsion spring to a workpiece. By being pre-stressed, the torsion spring transmits torque loads as a rigid non-deflecting coupling so long as the transmitted torque is equal to or less than the pre-stressed torque of the torsion spring. When the impact torque load applied to the torsion spring by the rotary impact tool exceeds the pre-stressed torque of the torsion spring, the torsion spring begins acting as a spring, instead of a rigid coupling, and deflects an additional amount and then rebounds to absorb and dissipate the excessive impact torque load without transmitting it to the workpiece.

The above described arrangement does a fine job in limiting the maximum torque output of a rotary impact tool. However, its attractiveness is lessened by the fact that the torsion spring is difficult to adjust to selected values of pre-stressed torque and such adjustment requires a special jig or other complicated apparatus.

The principal object of this invention is to overcome and substantially eliminate the problems present in the above described conventional torque limiting means and to provide an impact tool torque limiting arrangement which can be readily and simply adjusted without utilizing special jigs or similar types of devices.

Other objects of this invention are: to provide an improved torque limiting means for a rotary impact tool; to provide a torque limiting means of the pre-stressed torsion spring type which automatically locks the torsion spring against unwinding; and to provide a rotary impact tool torque limiting means which can be adjusted by using conventional tools.

Briefly, the objects of this invention are accomplished by fixing the rear end of the torsion spring to the rotary anvil of the impact tool, thus preventing rotation therebetween, by connecting the front end portion of the torsion spring to the anvil by an adjustment member which is joined to both the anvil or to the torsion spring by separate non-rotatable keyed joints and by arranging at least one of the keyed joints to include a worm screw engaging a series of worm gear teeth so that the front end of the torsion spring is wound, relative to its rear end, as the worm screw is rotated on the torsion spring and the anvil.

The invention is illustrated in the accompanying drawings wherein:

FIG. 1 is a longitudinal sectional view of the front portion of a rotary impact tool containing an adjustable torque limiting means constructed in accordance with this invention;

FIG. 2 is a section taken on line 2—2 of FIG. 1; and

FIG. 3 is a section taken on line 3—3 of FIG. 1.

The rotary impact tool shown in the drawing includes an outer housing or casing 1 containing a rotary motor (not shown) driving a rotary hammer 2 which, as it rotates, periodically strikes an impact or blow to a rotary anvil 3. The anvil 3 includes an integral forwardly extending tubular portion 4 journaled in a bearing 5 mounted in the front end of the impact tool housing 1. The tubular portion 4 of the anvil surrounds an elongated torsion spring or bar 6 having its rear end 7 formed as a square plug non-rotationally seated in a corresponding square hole in the anvil 3, so that the impacts received by the anvil 3 from the hammer 2 are rigidly coupled to the upper end of the torsion spring 6.

The forward end 8 of the torsion spring 6 is adapted to engage a workpiece, such as a nut or bolt head. This engagement is accomplished by means of a socket (not shown) having a square hole for detachably receiving the square forward drive end 8 of the spring 6. The foregoing structure is conventional in the rotary impact tool art.

The impact energy received by the anvil 3 is transmitted by the torsion spring 6 to a workpiece. In order for the spring 6 to accomplish this, it must be wound or pre-stressed under a torque which is equal to or greater than the torque of the impacts being transmitted. Once the spring 6 is wound under a given torque load, it acts as a rigid coupling in transmitting torque loads which are equal to or less than the pre-stressing torque of the spring. In other words, so long as the torque loads applied to the torsion spring 6 do not exceed its pre-stressed torque, no further deflection of the spring 6 occurs.

The torque load applied by the anvil 3 to the torsion spring 6 is determined by the resistance of the workpiece to a rotary movement. If the workpiece is free to turn under low values of torque, the torque load on the torsion spring 6 is low. As the resistance of the workpiece to rotary movement increases, as it is tightened, the torque loads on the torsion spring 6 progressively rise in a corresponding manner until either reaching the maximum impact torque applicable by the hammer 2 to the anvil 3, or exceeding the pre-stressed torque of the torsion spring 6.

When the impact torque load applied to the torsion spring 6 exceeds its pre-stressing torque, the spring 6 deflects or winds up additionally under each impact and then rebounds, resulting in the impact being absorbed substantially by the spring 6 without transmitting it to the workpiece. Thus, the torsion spring 6 acts to limit the maximum torque applicable to a workpiece to a value of torque equaling substantially the pre-stressed torque of the spring 6.

This invention covers a means for winding up or pre-stressing the torsion spring 6. A barrel or adjustment member 10, shown in FIG. 1, fits over the front end portion of the torsion spring 6 and over the front end portion of the anvil tubular portion 4. The barrel 10 is non-rotationally keyed to the front end portion of the anvil tubular portion 4 by means of a series of inter-engaging helical splines 12 and grooves 13, as shown in FIG. 3. The splines 12 are integrally formed on the circumference of a portion of the anvil tubular portion 4 and the grooves 13 are cut in the interior of the barrel 10. The splines 12 are substantially narrower than the grooves 13 to provide a sufficient amount of play or lost motion for the torsion spring 6 to deflect when the applied torque load exceeds its pre-stressing torque.

The barrel 10 is joined to the torsion spring 6 by a worm and worm gear means which is operative to wind or pre-stress the spring 6. A pair of externally threaded worm screws 15 are rotatably journaled in a pair of sockets 16 located at diametrically opposed points on the circumference of the barrel 10. The sockets 16 extend tangential to a series of worm gear teeth 17 formed on the torsion spring 6 immpediately rearwardly of the socket driving end 8. The worm screws 15 fit snugly into the sockets 16, are freely rotatable therein and have their threads engaged with the worm gear teeth 17 so that turning the worm screws 15 in the proper rotary direction in their sockets causes the front end of the torsion spring 6 to be wound relative to its rear end. The worm screws 15 are provided with hexagonal shaped holes 18 in their outer ends adapted to receive a conventional Allen wrench used for turning the worm screws.

Each of the sockets 16 is closed at one end and open at the other end and both are arranged with their open ends facing in the same rotary direction. FIG. 2 shows the open ends of the sockets 16 facing in a counter-clockwise direction. As should be obvious by now, the pair of sockets 16 is only useful for winding the front end of the spring 6 in a single direction, which in FIG. 2 is the counter-clockwise direction. Winding the spring 6 in the counter-clockwise direction as shown in FIG. 2, causes the worm screws 15 to be biased and seated against the closed ends of the sockets 16. The use of two diametrically opposed worm screws 15 and sockets 16 distributes the torque load on the spring 6 on the opposite sides of the barrel 10 and prevents side thrust, such as would be present with the use of only a single worm screw, which might cause the spring 6 to bind in the barrel 10. The pitch of the threads on the worm screws 15 is selected to be small enough so that the spring 6 can be wound by turning the worm screws 15 with relatively little effort, using an Allen wrench, and so that the reaction torque of the wound spring 6 will normally lock the worm screws against being turned by vibration during the use of the impact tool.

Normally, an impact wrench torque limiting means is only used to drive a workpiece in the clockwise direction, shown in FIG. 2. Hence, the spring 6 is normally wound or pre-stressed in the counter-clockwise direction as seen in FIG. 2. However, on occasion, it may be useful to wind the torsion spring 6 in the opposite rotary direction, the clockwise direction looking at FIG. 2. This can be done by placing the worm screws 15 in the other pair of sockets 20 which open in the opposite rotary direction from the sockets 16. When the worm screws 15 are in the sockets 20, the winding of the spring 6 in the clockwise direction, as shown in FIG. 2, holds the worm screws 15 seated against the bottom of the sockets 20.

While in accordance with the patent statutes a preferred embodiment of the present invention has been illustrated and described in detail, it is to be particularly understood that the invention is not limited merely to this embodiment, but is only limited by the novel concepts of this invention.

Having described the invention, I claim:

1. In a rotary impact tool including a rotary anvil and a rotary hammer adapted to periodically strike the anvil, a coupling for transmitting the rotary hammer impacts from the anvil to a workpiece and limiting the maximum torque of the transmitted impacts to a selected predetermined value of torque which can be readily adjusted, said coupling comprising: a torsion spring having one end non-rotatably connected to said anvil and adapted to have its other end connected to a workpiece; an adjustment member mounted on the other end of said torsion spring; and engagement means interconnecting said adjustment member to both said spring and to said anvil for locking said adjustment member against rotation relative to said spring and anvil in at least one rotary direction, said engagement means including a worm screw engaging a series of worm gear teeth for rotating the opposite ends of said spring relative to each other and winding the spring to a pre-stressed torque as said worm screw is rotated.

2. The impact tool of claim 1 wherein: said adjustment member is a barrel surrounding said spring and said anvil; said worm screw is rotatably mounted on said barrel; and said series of worm gear teeth are fixed on said torsion spring.

3. The impact tool of claim 2 including: a pair of said worm screws rotatably journaled on said barrel at diametrically opposite points on the wall of the barrel in corresponding sockets in the barrel wall.

4. The impact tool of claim 3 including: a pair of sockets provided in the barrel wall for holding the worm screws to pre-stress the torsion spring in the clockwise direction; and another pair of sockets for holding the worm screws to pre-stress the torsion spring in the counter-clockwise direction.

5. The impact tool of claim 2 wherein: said barrel is joined to the anvil by an interengaging series of splines and grooves providing a limited amount of relative rotation between the barrel and anvil.

6. In a rotary impact tool of the torque limiting type containing an anvil member and a torsion spring member having one end fixed to the anvil member and adapted to be pre-stressed, a coupling means interconnecting the other end of the torsion spring member to the anvil member, comprising: a tubular barrel member non-rotatably keyed to both the spring member and the anvil member by two respective joints; and at least one of said joints including a worm screw rotatably mounted on said barrel member and engaging a series of worm gear teeth fixed on one of the other two members for rotating or winding the opposite ends of the spring member relative to each other as said worm screw is rotated on said barrel member.

References Cited in the file of this patent

UNITED STATES PATENTS

| | | |
|---|---|---|
| 2,227,762 | Ronning | Jan. 7, 1941 |
| 2,729,077 | Holloway | Jan. 3, 1956 |
| 2,822,677 | Reynolds | Feb. 11, 1958 |
| 3,020,775 | Musser | Feb. 13, 1962 |
| 3,024,629 | Raskhodoff | Mar. 13, 1962 |

FOREIGN PATENTS

| | | |
|---|---|---|
| 322,656 | Great Britain | Dec. 12, 1929 |